United States Patent [19]
Wiersma

[11] Patent Number: 5,804,239
[45] Date of Patent: *Sep. 8, 1998

[54] METHOD AND COMPOSITION FOR FOOD FLAVORING

[75] Inventor: Jack G. Wiersma, Jupiter, Fla.

[73] Assignee: Nouveau Technologies, Inc., Tequesa, Fla.

[ * ] Notice: The term of this patent shall not extend beyond the expiration date of Pat. No. 5,698,191.

[21] Appl. No.: 688,814

[22] Filed: Jul. 26, 1996

[51] Int. Cl.$^6$ ....................................... A23L 1/22
[52] U.S. Cl. .......................... 426/302; 426/309; 426/534; 426/538; 426/615; 426/638; 426/650; 426/651
[58] Field of Search ..................................... 426/302, 309, 426/534, 538, 615, 638, 650, 651

[56] References Cited

U.S. PATENT DOCUMENTS

| | | | |
|---|---|---|---|
| 3,906,116 | 9/1975 | Quesnel et al. ...................... | 426/651 X |
| 4,283,429 | 8/1981 | Todd, Jr. et al. ........................ | 426/250 |
| 4,285,981 | 8/1981 | Todd, Jr. et al. ........................ | 426/250 |
| 4,315,947 | 2/1982 | Todd, Jr. et al. ........................ | 426/250 |
| 4,343,823 | 8/1982 | Todd, Jr. et al. ........................ | 426/250 |
| 5,698,191 | 12/1997 | Wiersma et al. .................... | 424/78.09 |

*Primary Examiner*—Milton Cano
*Attorney, Agent, or Firm*—McHale & Slavin, P.A.

[57] ABSTRACT

A method and composition for food flavoring having a carrier, an amount of capsicum oleoresin, and an amount of a saponin sufficient to enhance the effectiveness of the oleoresin capsicum, whose effectiveness in greater than that of either capsicum oleoresin or saponin in absence of the other. The composition allows for the coating of food before cooking as well as for use on uncooked food providing a unique flavoring additive.

11 Claims, No Drawings

METHOD AND COMPOSITION FOR FOOD FLAVORING

BACKGROUND OF THE INVENTION

1. Field of the Invention

The present invention concerns a new method and composition for the adding to, and inclusion in, various foods for the specific purpose of measurable flavoring in an improved and effective manner.

2. Description of the Related Art

Attempts to incorporate flavorings in and on foods, both processed and in raw forms, in an efficient and effective manner have been utilized for years. However, in most instances when the flavorings are added to some foods i.e., nuts, seeds, popcorn, potato, corn, and other forms of chips and other, but not limited to, what is commonly referred to as "snack" foods, a residue of said flavorings often times is left on the surface of the food item creating a carryover of said flavorings to the hands of the person eating such foods. By example, when one wishes to add flavorings to popcorn it is primarily added after the popcorn has been processed (popped). In such instances the added flavoring often times effect the cleanliness and integrity of the product in a negative way. Where it is included in the process of preparation (popping), often times the flavorings leave the popcorn less palatable because of the softening and decreased stability of the finished product.

It has been further discovered that, in recent years, the general population is consuming a greater quantity of foods containing or added to, what is referred to in the industry as various levels of different forms of pepper or pepper extracts, to create a "hot" sensation of the food ingested. One finds that this activity is wide spread and is not limited to by geographical area.

It is known that under current methods of application, in particular for incorporation of the desired flavorings, but not limited to pepper or pepper extracts, that they are utilized in primarily a dry form. When utilized in this manner one creates either a removable surface residue, or loose solid inclusion into the food item. The added flavorings of course, are not limited to only pepper or pepper extracts, but also include other spices in general and other flavor additives. Additionally, the present invention has applications with such food compositions, but not limited to, such as the flavoring commonly referred to as "salsa." Further, the composition of the invention can be applied externally by merely applying it in a premixed liquid form directly to the food to be treated by the individual.

SUMMARY OF THE INVENTION

In accordance with this invention, a method and composition for food flavoring is effective and efficient in the incorporation of or on various foods. The composition of this invention includes an amount of capsicum oleoresin and an amount of a saponin sufficient to enhance the effectiveness of the capsicum oleoresin when incorporated into an appropriate carrier.

For purposes of demonstration, the composition was formulated in the following manner for application to raw (unpopped) popcorn and sunflower seeds. Two ounces (2 oz.) of a 50% triterpene saponin was mixed with six ounces (6 oz.) oleoresin capsicum, 1,500,000 SU and then mixed into two (2) quarts of canola oil. Once the mixture was stirred, the finished composition was applied to the raw (unpopped) corn and sunflower seeds at the rate of 30 drops solution to approximately five (5) ounces, by volume, of the unpopped popcorn and sunflower seeds.

The effectiveness of the composition of this invention is dramatically greater and longer lasting than that of either capsicum oleoresin or saponin in absence of the other. As a result of the favorable and synergistic interaction of the capsicum oleoresin and saponin components, modest use levels only of the composition are required for effectiveness.

The carrier can comprise water, fatty acid glycerides, and emulsions. When the carrier contains water, the pH of the composition is controlled in the range from 4 to 9.

By example, when the composition of the invention, incorporated into a fatty acid glyceride i.e., canola oil and is applied to "raw" popcorn prior to popping, one finds that the popcorn when popped maintains the flavoring of the capsicum oleoresin, without noticeable degradation to the end product either by discoloration or the breakdown of the structure of the popcorn. Because of the unique characteristics of the composition, which is discussed in detail later in this document, the stability of the flavor is maintained for the shelf life of the food applied to or in; all ingredients of this composition invention, of course, are food grade and permitted for the use in foods and drinks.

Other objectives and advantages of this invention will become apparent from the following description wherein are set forth, by way of illustration and example, certain embodiments of this invention.

DESCRIPTION OF THE PREFERRED EMBODIMENT

The capsicum oleoresin ingredient of the composition of this invention is an isolate from plants of the Capsicum family, such as *Capsicum annum* and *Capsicum frutescens*. Available sources of capsicum oleoresin are commonly known as paprika, red pepper, chili pepper, and chile powder. Ground red pepper is sometimes referred to as "cayenne," to signify a ground red pepper product of extremely high heat, however, the word "cayenne" does not carry an industry standard of heat level nor is it a particular type of Capsicum. In the spice trade which is the major user of red pepper varietal and origin distinctions are being de-emphasized in favor of standardizing by heat level. Heat level can be expressed in ASTA (American Spice Trade Association) units equal to parts per million of capsaicin measured by high pressure liquid chromatography, or in organoleptically determined Scoville heat units (SU), whereby 1 ASTA unit=15 SU. Pungency levels of ground red pepper typically range from 300 to 1,000 ASTA Heat Units corresponding to 4,500 to 60,000 SU.

For effectiveness in the composition of this invention, all capsicum preparations containing from 4,500 to 2,000,000 SU of oleoresin capsicum can be used. A tincture of capsicum frutescens (cayenne pepper, active ratio 1/10, alcohol 75% by volume) and oleoresin capsicum obtained by solvent extraction from dried ripe fruit of *Capsicum frutescens L.* or *Capsicum annum L.* standardized to 2,000,000 SU minimum in soybean oil are commercially available.

The saponin ingredient of the composition of this invention can be any one or more of the natural saponins which are foam producing water soluble glycosides found widespread in the plant kingdom. Structurally saponins are characterized by one or more carbohydrate moieties linked to a polycyclic aglycone or sapogenin moiety which can have a steroid, triterpene, or steroid alkaloid ring system. The carbohydrate moieties are most frequently derived from glucose, but saponins in which the aglycone is linked to other saccharides including without limitation rhamnose, xylose, galactose, and mannose, as well as disaccharides and trisaccharides, are also useful. Saponins are usually found in complex mixtures of closely related compounds, but separation of individual saponin compounds from one another is not required for use in accordance with this invention.

Preferred saponins that can be used in accordance with this invention include horse chestnut saponins such as alpha-escin, beta-escin, and combinations thereof; quillaja saponins such as those extracted from the bark of the tree *Quillaria saponaria*; root saponins such as those extracted from various species of soapwort roots such as Iranian soapwort root (*Acanthophlum squarrosum boiss*, family caryophyllaceae) and *Levantine* soapwort root (mixture of *Gysophila paniculata L. G. effusa*, and *G. acutiflia fisch*); saponins extracted from the group of plants consisting of Agave, Dioscorea, Yucca, Medicago, and Cyamopsis, particularly the *Yucca mohavenis, Yucca schidigera*, and *Yucca augustifolia*, as well as the saponin source materials of such sapogenins as *smilagenin, hecogenin*, and *tigogenin*.

A particularly preferred group of saponins that can be used in accordance with this invention has a triterpene aglycone moiety, especially that of a Δ 12-oleanene as in quillaic acid (formula I in which R=OH) and gypsogenic acid (formula I in which R=H).

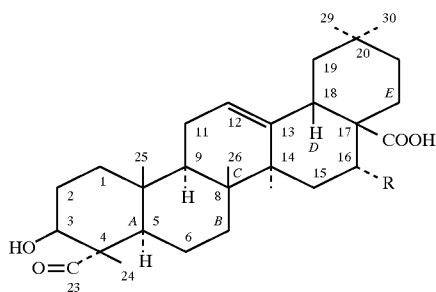

In the composition of this invention, the carrier is the preponderant ingredient, amounting to 85% or more of the whole. The amount of capsicum oleoresin present in the composition of this invention is in the range from 4,500 to 2,000,000 Scoville Units (SU) per 100 grams of the composition, preferably from 30,000 to 300,000 SU, and the amount of saponin (expressed on a dry basis) present in the composition is in the range from 0.02 gram to 10 grams per 100 grams of the composition, preferably from 0.03 gram to 6 grams per 100 grams of the composition.

The relative proportions in the composition of this invention of capsicum oleoresin and saponin to each other are in the range from 2,000 to 100,000,000 SU of capsicum oleoresin per gram of saponin dry basis, preferably from 10,000 SU to 1,000,000 SU per gram and most preferably from 20,000 SU to 200,000 SU of capsicum oleoresin per gram of saponin dry basis.

The composition of this invention can be prepared by combining the ingredients thereof in any order found convenient. It is particularly preferred first to combine the capsicum and saponin ingredients into an emulsion, which affords a stable and useful concentrate for economical storage and shipment for subsequent combination with the carrier to provide the composition of this invention.

The preparation of a concentrated emulsion including the capsicum and saponin ingredients of the composition according to this invention proceeds with remarkable ease. Specialized equipment conventionally used for preparing emulsions, exemplified by high speed agitators and colloid mills, can be used but is not necessary. Even hand stirring with a simple paddle is sufficient.

Temperature conditions during the preparation of the invention are not critical and can range from near freezing to just below boiling according to the characteristics of the particular ingredients, from abut 5° C. to about 95° C. for compositions containing water. When an ingredient of the composition converts from a solid to a liquid at a temperature within this range, the preparation is preferably carried out above this conversion temperature.

When the carrier ingredient of the composition of this invention comprises a fatty acid glyceride, all esters of glycerine with one, two, or three fatty acid residues having 6 to 24 carbon atoms in the fatty acid are effective. Drying as well as non-drying glycerides can be used. Preferred fatty acid glycerides include medium chain length glycerides such as naturally occurring in fats and oils such as coconut oil, corn oil, canola oil, cottonseed oil, fish oil, lard oil, linseed oil, rapeseed oil, soybean oil; derivatives of such fats and oils including monoglycerides, diglycerides, epoxidized oils and hydrogenated oils; and mixtures of two or more fatty acid glycerides. The composition of this invention can be incorporated in or applied to many kinds of foods. Non-limiting examples include all types of nuts, edible seeds such as sunflower seeds, popcorn, corn chips, potato chips, flavored chips salsa dips for food, meats such as steaks etc., any dipping composition for vegetables and snack foods of all types.

Without wishing to be limited by any theory, it is believed that the surprising effectiveness and durability of the composition of this invention is due, at least in part, to such unique properties of the emulsion comprising oleoresin capsicum and saponin as a reduction in surface tension as it relates to the application of the emulsion to various foods. This reduction in surface tension allows for a superior adhesion of the composition to the various food surfaces, more specifically, allows for the composition to efficiently bind to the solid foods surface and food contents being treated. This molecular binding thereby allows not only a superior distribution of the composition but additionally allows for nearly equal and stabilized containment within the entire foods content i.e., processed foods such as by example those foods whereby the composition has been added into the formulation of said foods and when said composition of this invention has dried onto the surface to which it has been applied. the reduced surface tension characteristics of the composition of this invention also allows for improved adhesion of the composition to the surface to which it has been applied.

The effectiveness of the composition of this invention is maintained for long periods of time, up to the shelf life of the food applied to or other food in which it is incorporated. The following example provided by way of illustration and not of limitation of the invention, whose scope is defined by the appended claims.

EXAMPLE

A concentrated emulsion for use in preparing compositions according to this invention: an oil in water emulsion was prepared by stirring together with a simple stirrer 84 ounces of oleoresin capsicum concentrate standardized at 1,500,000 Scoville thermal heat units (SU) and 44 ounces of a 50% aqueous concentrate of saponin from quillajasaponaria MOLINA, adding the oleoresin capsicum to the saponin and thus affording one gallon of an amber colored stable emulsion having a pH of approximately 5, surface tension of approximately 44.6 dyn/cm, and viscosity greater than that of either ingredient.

This example illustrates the successful preparation of a stable emulsion for the use in preparing the composition according to this invention.

It is to be understood that while I have described certain forms of my invention, it is not to be limited to the specific forms or arrangement herein described. It will be apparent to those skilled in the art that various changes may be made without departing from the scope of the invention and the invention is not to be considered limited to what is described in the specification.

I claim:

1. An emulsion for use in food preparation comprising:

a carrier oil;

a capsicum oleoresin concentrate admixed to said carrier oil; and a saponin concentrate admixed to said carrier;

wherein said capsicum concentrate and said saponin concentrate is admixed to said carrier oil forming a stable emulsion of amber color.

2. The composition according to claim 1 wherein said oleoresin capsicum is between 4,500 and 2,000,000 SU.

3. The composition according to claim 1 wherein said oleoresin capsicum is selected from the group of paprika, red pepper, chili pepper, and chili powder.

4. The composition according to claim 1 wherein said saponin is from the triterpene saponin group.

5. The composition according to claim 4 wherein said triterpene saponin is quillajasaponaria MOLINA.

6. The composition according to claim 1 wherein said emulsion has about a 5 pH.

7. The composition according to claim 1 wherein said carrier oil includes as least one type of fatty acid glyceride.

8. The composition according to claim 7 wherein said carrier oil is selected from the group of coconut oil, corn oil, canola oil, cottonseed oil, fish oil, lard oil, linseed oil, rapeseed oil, soybean oil.

9. The composition according to claim 7 wherein said carrier oil is selected from the group of derivatives of such fats and oils including monoglycerides, diglycerides, epoxidized oils and hydrogenated oils.

10. A method of food preparation comprising the steps of:

admixing a capsicum oleoresin concentrate and a saponin concentrate to a carrier oil to form an emulsion; and coating food with said emulsion.

11. The method of food preparation according to claim 10 wherein said step coating includes a means for allowing the emulsion to adhere to the food.

* * * * *